US012166258B2

(12) United States Patent
Madsen

(10) Patent No.: US 12,166,258 B2

(45) Date of Patent: Dec. 10, 2024

(54) MICROWAVE CIRCULATOR HAVING DISCONTINUOUS FERRIMAGNETIC ARRAY

(71) Applicant: Keysight Technologies, Inc., Santa Rosa, CA (US)

(72) Inventor: Christopher Madsen, Colorado Springs, CO (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 153 days.

(21) Appl. No.: 18/096,936

(22) Filed: Jan. 13, 2023

(65) Prior Publication Data

US 2024/0243458 A1 Jul. 18, 2024

(51) Int. Cl.
*H01P 1/387* (2006.01)

(52) U.S. Cl.
CPC .................................... *H01P 1/387* (2013.01)

(58) Field of Classification Search
CPC .. H01P 1/387; H01P 1/38; H01P 1/383; H01P 1/393; H01P 1/397; H01P 1/32; H01P 1/36; H01P 1/262; H01P 1/265; H01P 1/37; H01P 1/375
USPC .................................................. 333/1.1, 24.2
See application file for complete search history.

(56) References Cited

U.S. PATENT DOCUMENTS

| | | | | |
|---|---|---|---|---|
| 5,438,167 | A | 8/1995 | McClananhan et al. | |
| 9,543,627 | B2 | 10/2017 | Kim et al. | |
| 2017/0025729 | A1* | 1/2017 | Chen | H01P 1/387 |
| 2018/0240963 | A1* | 8/2018 | Ketterson | H10N 50/80 |

OTHER PUBLICATIONS

Louis-Philippe Carignan et al., "Integrated and Self-Biased Planar Magnetic Microwave Circuits Based on Ferromagnetic Nanowire Substrates", Proceedings of the 39th European Microwave Conference, Sep. 29-Oct. 1, 2009, pp. 743-746.

Sandor Hosszú et al., "Computer Aided Microstrip Circulator Design", 18th International Conference On Microwaves, Radar and Wireless Communications, 2010, pp. 1-4.

(Continued)

*Primary Examiner* — Stephen E. Jones

(57) ABSTRACT

A circulator and similar devices adapted for use in the transmission and reception of electromagnetic signals, such as microwave and RF signals. Beneficially, the circulator is formed from a single layer, comprising vias therein that all or some of which are filled with a ferrimagnetic material that is used to generate a magnetic field in a particular direction. The magnetic field is a vector sum of the magnetic field generated in each of the vias filled with a ferrimagnetic material that is biased with an external magnetic field in a specific direction to establish a preferred precessional motion of the material's constituent dipoles. This preferred precessional motion will govern the circulatory behavior and non-reciprocal properties of the device when an external signal is applied. As noted above, this magnetic field guides electromagnetic signals in a first direction that substantially prevents an electromagnetic signal from propagating in a second direction opposite the first direction.

18 Claims, 13 Drawing Sheets

(56) References Cited

OTHER PUBLICATIONS

"Dual microstrip and microstrip isolators & circulators," Quantic Corry, Dec. 2020, https://cormic.com/dual-microstrip-and-microstrip-isolators-circulators/, 1 pg.
Aimad Saib et al., "Unbiased microwave circulator based on ferromagnetic nanowires arrays of tunable magnetization state," J. Phys. D: Appl. Phys. 38 (2005), pp. 2759-2763.
A. McNeill, "Understanding the basics of microwave microstrip isolator and circulator technologies, " Smiths Interconnect-Blog post—the anatomy of a microstrip isolator and circulator, Nov. 2021, pp. 1-5.

* cited by examiner

300

MICROWAVE CIRCULATOR HAVING DISCONTINUOUS FERRIMAGNETIC ARRAY

BACKGROUND

Passive circulators are devices used to direct electromagnetic signals (e.g., radio frequency (RF) and microwave signals) to three or more ports in a circuitous manner, and are used in a variety of circuit devices including isolators and duplexers. Passive circulators include a ferrimagnetic medium disposed in a DC magnetic field biasing source, and signal transmission lines ('transmission lines') that terminate to a center conductor. Generally, passive circulators may be disposed on a substrate comprising a material adapted for use at the frequency of signal transmission (e.g., microwave and RG frequencies).

A passive circulator relies on a magnetic field (H-field) in a ferrite medium to establish a magnetic field that guides electromagnetic signals from an input port in a (first) rotational manner to a next port, while preventing the transmission of the electromagnetic signals in an opposing (second) rotational manner to another adjacent port. The isolation of the other adjacent port from the input port in the second direction is beneficial in many applications, especially in communications systems.

Just by way of illustration, a three port circulator comprising a first port, a second port and a third port is adapted to pass electromagnetic signals incident on a first port in a first direction to the second port, and, again in the first direction, from the second port to the third port. However, transmission in the opposing direction (e.g., from the third port to the second port, and from the second port to the first port) is substantially prevented, thereby providing a high degree of transmission from port to port in one direction and a high degree of isolation from one port to another in a second direction opposite to the first direction.

One type of known circulator is known as a surface mount circulator. In one type of surface mount circulator, a comparatively large cylindrical ferrimagnetic element is disposed in a dielectric substrate. Another type of known surface mount circulator comprises a multi-layer ferrite structure.

These known circulators pose significant drawbacks in manufacturing complexity, reliability, or both. For example, providing an opening to receive a comparatively large magnetic cylindrical is labor intensive, adds undesired weight to the circulator, and because of the comparatively large opening required for the comparatively large cylindrical ferrimagnetic element, increases the fragility and the weight of the resultant device.

Multilayer substrate structures also suffer from undesired fragility and cost. For example, because of the composition of the ferrimagnetic material used in a multi-layer substrate circulator, which is inherently brittle and fragile, in final form an overall undesired degree of fragility is found in known passive circulators made from multilayer substrates. In an attempt to avoid this deficiency, certain known multilayer substrate circulators are mounted on a carrier plate that provides an increase in overall robustness of the resultant device. However, the density of ferrimagnetic materials increases the weight due to the comparatively large volume of the ferrimagnetic element used in the known circulator, increases the overall weight of the resultant circulator, further contributing to the fragility of the resultant device.

What are needed, therefore, are a passive circulator device that overcome at least the drawbacks of known methods and systems described above.

SUMMARY

According to an aspect of the present disclosure, a circulator comprises a single layer substrate. A plurality of vias exist in the single substrate, and some or all of the plurality of vias comprises a ferrimagnetic material disposed therein. The circulator further comprises a first port, a second port and a third port disposed over the single layer substrate. The circulator further comprises a magnet disposed over the vias. A preferred magnetic dipole alignment is generated within the ferrimagnetic material having a first direction that substantially prevents an electromagnetic signal from propagating in a second direction opposite the first direction.

According to another aspect of the present disclosure, a device comprises a circulator. A plurality of vias exist in the single layer substrate, and some or all of the plurality of vias comprises a ferrimagnetic material disposed therein. The circulator further comprises a first port, a second port and a third port disposed over the single layer substrate. The circulator further comprises a magnet disposed over the vias. A preferred magnetic dipole alignment is generated within the ferrimagnetic material having a first direction that substantially prevents an electromagnetic signal from propagating in a second direction opposite the first direction. The device further comprises a filter disposed over the single substrate. The filter is connected to one of the first port, or the second port, or the third port.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

Figure 1A:
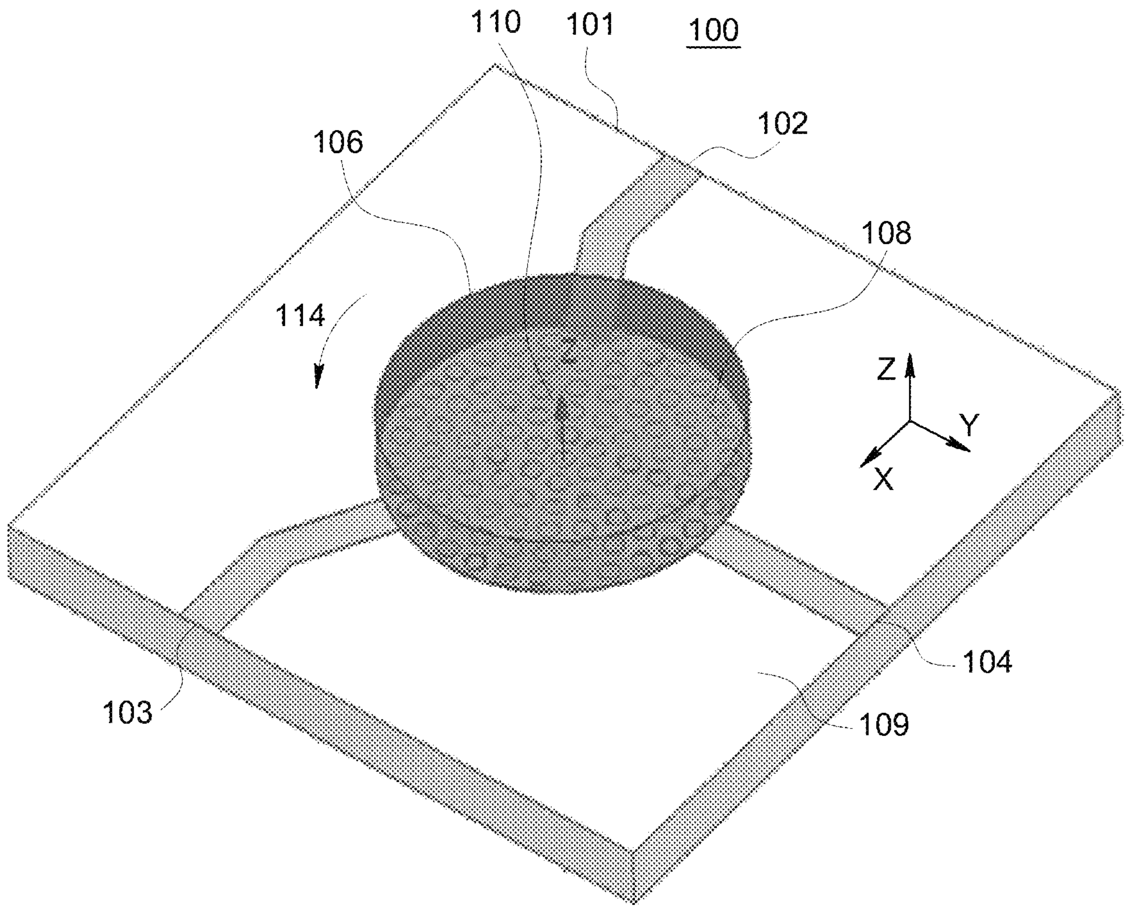
FIG. 1A is a perspective view of a circulator according to a representative embodiment.

In the following detailed description, for the purposes of explanation and not limitation, representative embodiments disclosing specific details are set forth in order to provide a thorough understanding of an embodiment according to the present teachings. Descriptions of known systems, devices, materials, methods of operation and methods of manufacture may be omitted so as to avoid obscuring the description of the representative embodiments. Nonetheless, systems, devices, materials and methods that are within the purview of one of ordinary skill in the art are within the scope of the present teachings and may be used in accordance with the representative embodiments. It is to be understood that the terminology used herein is for purposes of describing particular embodiments only and is not intended to be limiting. The defined terms are in addition to the technical and scientific meanings of the defined terms as commonly understood and accepted in the technical field of the present teachings.

It will be understood that, although the terms first, second, third, etc. may be used herein to describe various elements or components, these elements or components should not be limited by these terms. These terms are only used to distinguish one element or component from another element or component. Thus, a first element or component discussed below could be termed a second element or component without departing from the teachings of the inventive concept.

The terminology used herein is for purposes of describing particular embodiments only and is not intended to be limiting. As used in the specification and appended claims, the singular forms of terms "a," "an" and "the" are intended to include both singular and plural forms, unless the context clearly dictates otherwise. Additionally, the terms "comprises," "comprising," and/or similar terms specify the presence of stated features, elements, and/or components, but do not preclude the presence or addition of one or more other features, elements, components, and/or groups thereof. As used herein, the term "and/or" includes any and all combinations of one or more of the associated listed items.

Unless otherwise noted, when an element or component is said to be "connected to," "coupled to," or "adjacent to" another element or component, it will be understood that the element or component can be directly connected or coupled to the other element or component, or intervening elements or components may be present. That is, these and similar terms encompass cases where one or more intermediate elements or components may be employed to connect two elements or components. However, when an element or component is said to be "directly connected" to another element or component, this encompasses only cases where the two elements or components are connected to each other without any intermediate or intervening elements or components.

As used in the specification and appended claims, and in addition to their ordinary meanings, the term "approximately" mean to with acceptable limits or degree. For example, "a count value of an assembly under test is greater than approximately 10% of a count value of an intact separator" means one of ordinary skill in the art would consider the count values differ by 10% within reasonable measure.

As used in the specification and appended claims, in addition to their ordinary meanings, the term 'substantially' means within acceptable limits or degree. For example, the "partial discharge currents are substantially the same" means one of ordinary skill in the art would consider the partial discharge currents to be the same.

The present disclosure, through one or more of its various aspects, embodiments and/or specific features or sub-components, is thus intended to bring out one or more of the advantages as specifically noted below. For purposes of explanation and not limitation, example embodiments disclosing specific details are set forth in order to provide a thorough understanding of an embodiment according to the present teachings. However, other embodiments consistent with the present disclosure that depart from specific details disclosed herein remain within the scope of the appended claims. Moreover, descriptions of well-known apparatuses and methods may be omitted so as to not obscure the description of the example embodiments. Such methods and apparatuses are within the scope of the present disclosure.

By the present teachings, and as described herein with respect to various representative embodiments, a circulator and similar devices adapted for use in the transmission and reception of electromagnetic signals, such as microwave and RF signals. Beneficially, the circulator is formed from a single layer, comprising vias therein that all or some of which are filled with a ferrimagnetic material that is used to generate a magnetic field in a particular direction. The magnetic field is a vector sum of the magnetic field generated in each of the vias filled with a ferrimagnetic material that is biased with an external magnetic field in a specific direction to establish a preferred precessional motion of the material's constituent dipoles. This preferred precessional motion will govern the circulatory behavior and non-reciprocal properties of the device when an external signal is applied. As noted above, this magnetic field guides electromagnetic signals in a first direction that substantially prevents an electromagnetic signal from propagating in a second direction opposite the first direction.

Beneficially, the ferrimagnetic material is used due to the number of unpaired dipoles present within it that can be aligned to an external biasing field. As described more fully below, the magnetic dipoles will align with an external field, which introduces a torque to the dipole, forcing it into a state of precession that follows a rotational direction governed by the biasing field direction (e.g., +/−z direction as noted below). An applied AC signal interacts with the dipoles, forcing them again into a state of precession. When the rotational direction of the circularly polarized AC field matches the natural precession direction of the dipoles, the magnetization vector and its angle to the z-axis is maximized vs. an oppositely polarized AC field.

Various improvements to the field of microwave and RF components, and devices comprising more than one microwave device are realized by the implementation of practical applications of the present teachings and according to representative embodiments described below. As will become clearer as the present description continues, devices of the various representative embodiments minimize the volume and weight of ferrimagnetic material. Devices of the various representative embodiments have improved robustness compared to known devices because the crystalline structure of the single layer substrate is disturbed less than devices having a single cylindrical ferrimagnetic element. This improved robustness improves the yield during fabrication of the devices and reliability after implementation of the devices. In addition, and again as will be described more fully below, the devices of the various embodiments reduce the complexity of the fabrication process compared to other devices built on a multilayer platform, and lend themselves to thick film processes. As alluded to above, in certain embodiments, the circulators of various representative embodiments can be cascaded with other devices fabricated on the same single layer substrate while maintaining surface mount structures of the devices. Notably, the devices of the representative embodiments are useful in a variety of applications including surface-mount applications in various technologies.

FIG. 1A is a perspective view of a circulator 100 according to a representative embodiment. The circulator 100 comprises a single layer substrate 101 comprising a first port 102, a second port 103 and a third port 104 disposed over an upper surface 109 of the single layer substrate 101. As described more fully below, the first~third ports 102~104 are signal transmission lines with the signal line disposed over the upper surface 109 as shown, and a ground plane disposed on a lower surface (not shown in FIG. 1A) opposing the upper surface 109.

The circulator 100 further comprises a DC magnet 106 over a plurality of vias 108 formed in the single layer substrate 101. Some or all of the plurality of vias are filled with a ferrimagnetic material (not shown in FIG. 1A). As described more fully below, an overlap of the DC magnet 106 and the plurality of vias 108 comprises an area as shown, with the plurality of vias 108 being disposed from a middle of the area 110 to an edge of the area 112. The single layer substrate 101 comprises a material suitable for applications in microwave and RF transmission.

As will be appreciated, the single layer substrate 101 forms the dielectric layer for the signal transmission lines disposed over its upper surface 109 (e.g., first port 102) and a ground plane (not shown) disposed on the lower surface opposing the upper surface. Illustratively, the single layer substrate 101 has a crystalline structure that affords not only good dielectric properties for transmission of electromagnetic radiation, but also provides structural strength for the robustness of the circulator 100. More generally, the single layer substrate 101 may be either single crystal (e.g., sapphire) or polycrystalline alumina. Single crystal beneficially provides a comparative improvement mechanical strength and better consistency in the permittivity of the material than other possible materials. Sapphire tends to have a magnificent, polished surface that helps to reduce loss, whereas normal alumina tends to be a bit rougher. This is beneficial for adherence of thick film pastes, but does increase loss at high frequency.

The single layer substrate 101 comprises a ceramic material adapted for operation across a microwave and RF frequency range. Just by way of example, the ceramic material comprises alumina ($Al_2O_3$), aluminum nitride, sapphire, quartz, or zirconia, and is substantially a thick film substrate. The thickness (in the z-direction of FIG. 1A) depends on the material selected for use as the single layer substrate 101. Notably, the thickness of the single layer substrate 101 is dependent on application and frequency in microstrip transmission line applications. A trade-off can be required—a thicker substrate is desired for mechanical resilience, but the thickness of the substrate will unfortunately scale inversely with frequency. For example, at millimeter wave frequencies, the single layer substrate has a maximum thickness of approximately 10 mil.

Just by way of example, an alumina substrate used for signal transmission at RF and microwave wavelengths has a thickness in a range of approximately $4\times10^{-3}$ inches (4 mils) to approximately 100 mils, but generally have a thickness of approximately 10 mils to approximately 40 mils. Alumina is used for the single layer substrate 101 in both thick film and thin film applications. Alumina provides comparatively low loss (tan $\delta$ of approximately $1\times10^{-4}$), and beneficially provides a substrate of sufficient hardness for applications of the present teaching. Moreover, the electrical insulation characteristics, chemical and moisture resistance, and dielectric properties of alumina are desirable for the various circulators of the present teachings. Moreover, the comparatively high permittivity (9.4-9.6) results in smaller devices being required due to the shortened wavelength of an incident signal.

When alumina is selected for the single layer substrate 101, illustrative thicknesses for thick film are approximately $10\times10^{-3}$ inches (10 mils), approximately 15 mils and approximately 25 mils, though lesser or greater thicknesses are contemplated. More generally, the single layer substrate in thick film applications may have a thickness in the range of approximately 5 mils and approximately 40 mils. For the simulation used to generate this patent, the dimensions of the substrate were 6.35 mm×6.35 mm×0.381 mm (250×250×15 mil). These dimensions are highly dependent on the device. In this case, the radius of the via array will change based on the specifications of the device, in turn increasing or decreasing the substrate dimensions.

The vias 108 are formed by the selective removal of portions of the single layer substrate 101 using a known technique. For example, the holes may be "drilled" into the single layer substrate 101 using a known laser drilling technique. This provides comparatively tight control of the via diameter and geometry of the hole. The vias then go to a screen print process that fills the vias with a ferrimagnetic powder and non-conductive paste mixture, which generally has a viscosity different from the paste used for conductors. The part is then fired, completing the vias. Next, a conductor layer is then printed over the vias to complete contact between the signal plane and the ground plane.

The ferrimagnteic powder used to fill the vias 108 include, but are not limited to, lithium ferrites, manganese compounds, and various oxides of iron. Beneficially, these powders would be mixed with a more traditional fill paste to form a mixture that has: a comparatively high electrical resistivity; a coefficient of thermal expansion similar to the material used for the single layer substrate 101; is suitable at typical sintering temperatures; is corrosion resistant; and is compatible with existing conductor paste that will be placed over the capped vias As described below, the ferrimagnetic material used to fill the vias 108 have magnetic dipoles that precess around the axis of the magnetic biasing field provided by the DC magnet 106.

As described more fully below, the DC magnet 106 establishes a magnetic field in a direction perpendicular to the substrate (±z direction in the coordinate system of FIG. 1A) Just by way of illustration, the DC magnet 106 comprises a permanently magnetized ferromagnetic or ferrimagnetic material useful for generating the required external field and having a Curie temperature above that required for surface-mount reflow processes. The DC magnet 106 is adhered to a conductive layer (not shown) disposed over the upper surface 109 in the region of overlap of the DC magnet 106 and the plurality of vias 108 using an electrically non-conductive epoxy or similar adhesive.

The substantially uniform DC bias magnetic field provided by the DC magnet 106 exerts a torque on the magnetic dipole moments within the ferrimagnetic material in the vias

108. This forces the dipoles in a precession around the axis of the bias magnetic field, with the direction of the precession dependent on the direction of the bias magnetic field. As described more fully below, due to material damping, the magnetic dipoles of the ferrimagnetic material cease precessing and align themselves with the axis of the bias magnetic field, moving the material magnetization vector heavily toward this axis (e.g., the +z axis of FIG. 1A). However, the incident magnetic field from the input port of the circulator 100 has magnetic field components along all three axes of the coordinate system of FIG. 1A. At the proper resonance frequency (the Larmor frequency) the magnetic dipoles of the filled vias 108 are tipped back into a state of precession, with the magnetization vector of the ferrimagnetic material in the vias 108 being a function of the sum of the input electromagnetic field and ferrimagnetic magnetic field components.

The total magnetic field, $\vec{H}_t$, is represented as the vector sum of the biasing field $H_0$ (provided by the magnet) and the applied AC field (provided by a signal), $\vec{H}$ $$\vec{H}_t = H_0\hat{z} + \vec{H}$$

It was shown that a linearly polarized incident wave decomposes into a right- and left-hand polarization when encountering the circulator. A right-hand circularly polarized wave can be put into phasor form as:

$$\vec{H}^+ = H^+(\hat{x} - j\hat{y})$$

With the magnetization vector, $\vec{M}^+$ tying into $\vec{H}^+$ as $$\vec{M}^+ = M_x^+\hat{x} + M_y^+\hat{y} = \frac{\omega_m}{\omega_0 - \omega}H^+(\hat{x} - j\hat{y})$$

where $\omega_m$, $\omega_0$, and $\omega$ are the proportional frequency to the saturation magnetization, precession frequency, and incident AC signal frequency, respectively.

This last equation indicates that the magnetization vector $\vec{M}^+$ produced by the biasing field $H_0\hat{z}$ and incident AC signal $\vec{H}$ is a function of both, lying at an angle to the z-axis and operating in a precessional motion that follows the same directional rotation and frequency as the AC driving field, $\vec{H}^+$.

Magnetic properties within a material are defined by the existence of magnetic dipole moments arising from electron spin within the material. In most solid materials, the electron spins occur in pairs such that the overall magnetic moment is reduced. In magnetic materials, electron spins are unpaired, but oriented in random directions such that the overall magnetic moment is still negligible. When a magnetic field is applied to the magnetic material, the dipole moments will align in the same direction up to a point of saturation where all dipoles are aligned. This in turn creates a much larger aggregate magnetic dipole moment, effectively magnetizing the material The induced magnetic bias generates an axis upon which each magnetic dipole can precess. The bias exerts a torque (time rate of change of angular momentum) upon the dipolemoment, inducing precession at a rate known as the Larmor or precession frequency:

$$\omega_0 = \mu_0\gamma\vec{H_0} \quad (1)$$

where $\omega_0$ is the angular frequency of precession (Larmor frequency), $\gamma$ is the gyromagnetic ratio of an electron, and $\vec{H_0}=\hat{z}H_0$ is the applied magnetic bias vector along the z-axis.

The precession occurs in a manner around the axis of the magnetic bias (z-axis in the various depicted embodiments), generating a counter-clockwise or clockwise rotation of the dipole depending on the direction of the biasing field. Each dipole within the material that is aligned with the field will undergo this precession at a rate provided by (1). In a material with damping qualities, this precession will eventually cease unless acted upon by an external source, such as that provided by an AC signal operating at the frequency of precession.

The permeability of ferrimagnetic materials is of an anisotropic nature when in the presence of a magnetic field large enough to provide saturation, meaning the permeability changes depending on the observed direction within the material. The Polder tensor is a means of defining this anisotropy, as provided for a magnetic z-bias direction in (2) below.

$$[\mu] = \begin{bmatrix} \mu & -j\kappa & 0 \\ j\kappa & \mu & 0 \\ 0 & 0 & \mu_0 \end{bmatrix} \quad \#(2a)$$

where $$\mu = \mu_0\left(1 + \frac{\omega_0\omega_m}{\omega_0^2 - \omega^2}\right) \quad \#(2b)$$

$$\kappa = \mu_0\left(\frac{\omega\omega_m}{\omega_0^2 - \omega^2}\right) \quad \#(2c)$$

Where $\mu_0$ is the permeability of free space, $\omega_0$ is the natural precession (Larmor) frequency, $\omega_m$ the frequency proportional to the saturation magnetization, and $\omega$ the angular frequency of the incident signal.

Analyzing the operation of a planar circulator with microstrip terminations necessitates several assumptions. Specifically, The incident E-field is strictly along the axis of the magnetic bias vector:

$$\frac{\partial}{\partial z} = 0 \quad \#(2d)$$

$$E = E_z i_z \quad \#(2e)$$

Moreover, the magnetic biasing field is uniform and the dipole precession is in a substantially uniform mode.

Equations (3a) to (5d) relate to stripline signal transmission. However, microstrip maintains many of the same assumptions as stripline and the overall physics of operation is substantially identical.

Using the Polder tensor in (2a), Maxwell's equations can be written as:

$$\nabla\times\vec{E}=-j\omega[\mu]\vec{H} \tag{3a}$$

$$\nabla\times\vec{H}=j\omega\varepsilon\vec{E} \tag{3b}$$

$$\nabla\cdot\vec{D}=0 \tag{3c}$$

$$\nabla\cdot\vec{B}=0 \tag{3d}$$

Putting equations (2a), (2d), and (2e) into (3a), the H-field can then be expressed as a function of the E-field in cylindrical coordinates $$H_\rho=\frac{\left(\frac{1}{\rho}\frac{\partial E_z}{\partial\varphi}-j\frac{\kappa}{\mu}\frac{\partial E_z}{\partial\rho}\right)}{j\omega\mu_0\mu_{eff}} \tag{3e}$$

$$H_\varphi=-\frac{\left(\frac{\partial E_z}{\partial\rho}+j\frac{\kappa}{\rho\mu}\frac{\partial E_z}{\partial\varphi}\right)}{j\omega\mu_0\mu_{eff}} \tag{3f}$$

$$H_z=0 \quad \#(3g)$$

Where $$\mu_{eff}=\frac{(\mu^2-\kappa^2)}{\mu} \tag{3h}$$

Substituting (3e)-(3g) into (3b), the Helmholtz wave equation for $E_z$ can then be derived $$\left(\frac{\partial^2}{\partial\rho^2}+\frac{1}{\rho}\frac{\partial}{\partial\rho}+\frac{1}{\rho^2}\frac{\partial^2}{\partial\varphi^2}+k^2\right)E_z=0 \tag{4a}$$

Where $$k^2=\omega^2\varepsilon_0\mu_0\epsilon\mu_{eff} \tag{4b}$$

Using the azimuthal frequency, n, one solution of (4a) is $$E_z=a_{\pm n}J_n(k\rho)e^{\pm jn\varphi} \tag{5a}$$

With the magnetic field components found with respect to the E-field $$H_\rho=\pm a_{\pm n}Y_{eff}\left[\frac{nJ_n(\kappa\rho)}{\kappa\rho}\pm\frac{\kappa}{\mu}\left(\frac{nJ_n(\kappa\rho)}{\kappa\rho}-J_{n-1}(\kappa\rho)\right)\right]e^{\pm jn\varphi} \tag{5b}$$

$$H_\varphi=-ja_{\pm n}Y_{eff}\left[\frac{nJ_n(\kappa\rho)}{\kappa\rho}-J_{n-1}(\kappa\rho)\pm j\frac{\kappa}{\mu}\left(\frac{nJ_n(\kappa\rho)}{\kappa\rho}\right)\right]e^{\pm jn\varphi} \tag{5c}$$

Where $J_n$ is the nth-order Bessel function and $$Y_{eff}=\sqrt{\frac{\epsilon_0\epsilon}{\mu_0\mu_{eff}}} \tag{5d}$$

The solutions provided in (5a)-(5d) are considered right- and left-hand rotating waves for each plus and minus sign, respectively. This is important for understanding the circulatory and non-reciprocal effects of a circulator when an external signal is applied to the biased ferrimagnetic material.

When the ferrimagnetic material is magnetized via an external biasing source, the material is governed by the anisotropic Polder tensor in (2a). This in turn produces two different propagation constants, $\beta^+$ and $\beta^-$, that correspond with the right- and left-hand rotating waves generated from the linearly polarized incident wave from the microstrip. In an isotropic or unbiased ferrimagnetic material, these two constants are equal.

The two counterrotating fields interact with the precessing dipoles, which have a preferred rotational direction provided by the magnetic biasing field, $H_0$. Incident fields (an AC signal) with a rotational polarization direction identical to the dipoles' preferred precession have a different propagation constant from those fields with directions opposite the preferred procession. This in turn becomes a source of contention between the angular momentum of the dipole and the incident field.

The entirety of the theory of operation above was developed under the assumption that the ferrimagnetic material is continuous, i.e. a single piece or puck. When the material is divided, as it is with the discrete via array, the underlying operation is identical, but some aspects of the device's characteristics will change when compared to those of a full-sized puck.

Splitting a full puck into a discrete array will modify the properties of the overall volume, where the anisotropic permeability tensor is specifically of concern given its role in calculating the required circulator radius and magnetic field strength required for saturation. One means of calculating the impact is through a modified effective medium approximation, which provides a rough homogenous view and average of the geometry's characteristics using each ferrimagnetic via and the surrounding dielectric material as a unit cell.

In order to make this approximation, the characteristics of the unit cell must meet the condition $$a\ll\lambda \quad \#(6)$$

Where a is defined as the via period and A as the wavelength of the incident field. In the case of a 5.6 GHz circulator, a rough approximation can be made using the relative permittivity of the alumina material, 9.4.

In the case of this particular device, a was defined as 10.5 mil (0.2667 mm), with $$\lambda=\frac{c}{5.6\ \text{GHz}*\sqrt{9.4}}=17.5\ \text{mm} \tag{7a}$$

which provides a ratio of 65 between the via spacing and wavelength. The effective permeability of the unit cell, $\mu_{eff}$, can be defined:

$$\mu_{eff}=1-\frac{\pi r^2}{a^2}\left[1+i\frac{2\sigma}{\omega r\mu_0}\right]^{-1} \tag{7b}$$

where r is the radius of the via element (3.5 mil, 0.1018 mm), σ the resistance of the via surface (1.17 MΩ), and ω the radial frequency of the EM field, 2π*5.6 GHz in this case. From here, $\mu_{eff}$ can then be applied to the Polder tensor in (2a) as a correction factor.

Further correction in the form of an equivalent ferrite puck radius can then be applied by examining the ratio between the surface area of the vias constituting the device and the surface area of the surrounding substrate, utilizing the same cells to generate (6)-(7b).

$$via_{SA} = \sum_{1}^{i} \pi \cdot via_{rad-i}^{2}$$

$$ferr_{SA} = \pi \cdot ferr_{rad}^{2}$$

$$ferr_{SA-equiv} = ferr_{SA} \cdot \frac{ferr_{SA}}{via_{SA}}$$

$$ferr_{r-equiv} = \sqrt{\frac{ferr_{SA-equiv}}{\pi}}$$

where $via_{SA}$ is the sum of the via surface area, $ferr_{SA}$ is the surface area of the equivalent ferrite extracting from the design of the circulator, $ferr_{SA-equiv}$ is an equivalent ferrite surface area based on the ratio of the ferrite surface area and the total via surface area, and $ferr_{r-equiv}$ is the equivalent ferrite radius based on the via array. With the correction factors in place, simulation results were found to be within 1% of the design parameters.

Based on the above equations, dimensions of the circulator 100 and material parameters are developed from the operation frequency of the circulator, the magnetic saturation field of the ferrimagnetic material disposed in the vias 108, the resonance absorption parameters, the ferrimagnetic resonance frequency, the ferrimagnetic frequency magnetic saturation equivalent and factors relating to the operating characteristics of the ferrimagnetic material disposed in vias 108 and of the DC magnet 106. From these parameters, the magnetic saturation value, internal biasing values and Polder tensor are generated and provided to a suitable electromagnetic simulation platform (e.g., Ansys® HFSS) to determine the response characteristics of the circulator 100. As will be appreciated, values will change depending on the materials selected for the various components of the circulator 100.

This rotational magnetic field (e.g., counterclockwise direction 114) causes electromagnetic signals incident on a first port to travel to a second port adjacent to the first port in one direction (e.g., counterclockwise caused by an H-field in the +z direction), but dramatically impedes the travel of an electromagnetic signal in the opposite direction (e.g. clockwise) from the second port to the first port. Stated somewhat differently, for example, in one representative embodiment if the input port were the first port 102, the S-parameter S21 (transmission coefficient) is comparatively large, whereas the S12 parameter would have a comparatively large negative value. Similarly, from the second port 103 to the third port, S32 would be comparatively large, whereas S23 would have a comparatively large negative value. In this manner, electromagnetic waves incident from a signal transmission line (not shown in FIG. 1A) on the first port 102 would be guided with little loss by the counterclockwise magnetic field in the x-y plane to the second port 103, and to the third port 104, but would not be guided in the clockwise direction.

Figure 1B:
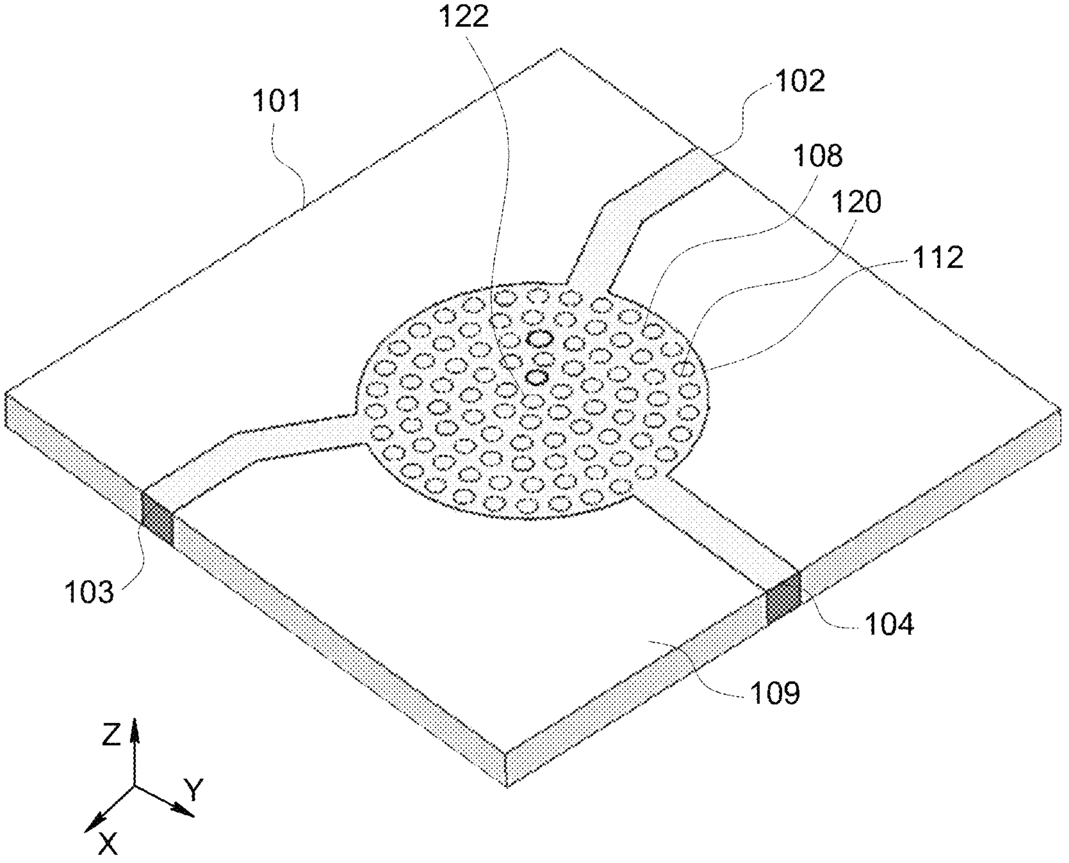
FIG. 1B is a perspective view of the circulator of FIG. 1A with the magnet removed to show the upper surface of the circulator, according to a representative embodiment.

FIG. 1B is a perspective view of the circulator 100 of FIG. 1A with the DC magnet 106 removed to show the upper surface of the circulator, according to a representative embodiment. Various common aspects and details of the circulator described above in connection with FIG. 1A may not be repeated in order to avoid obscuring the presently described representative embodiment.

The circulator 100 comprises the single layer substrate 101 comprising the first port 102, the second port 103, the third port 104, and a connecting signal transmission line 120 disposed over the upper surface 109 of the single layer substrate 101. Again, a ground plane disposed on a lower surface (not shown in FIG. 1B) opposing the upper surface 109. Generally, the connecting signal transmission line 120 is disposed over the area of overlap of the DC magnet 106 and the plurality of vias 108 comprises an area as shown, with the plurality of vias 108 being disposed from the middle to the edge of the area 112.

Figure 1C:
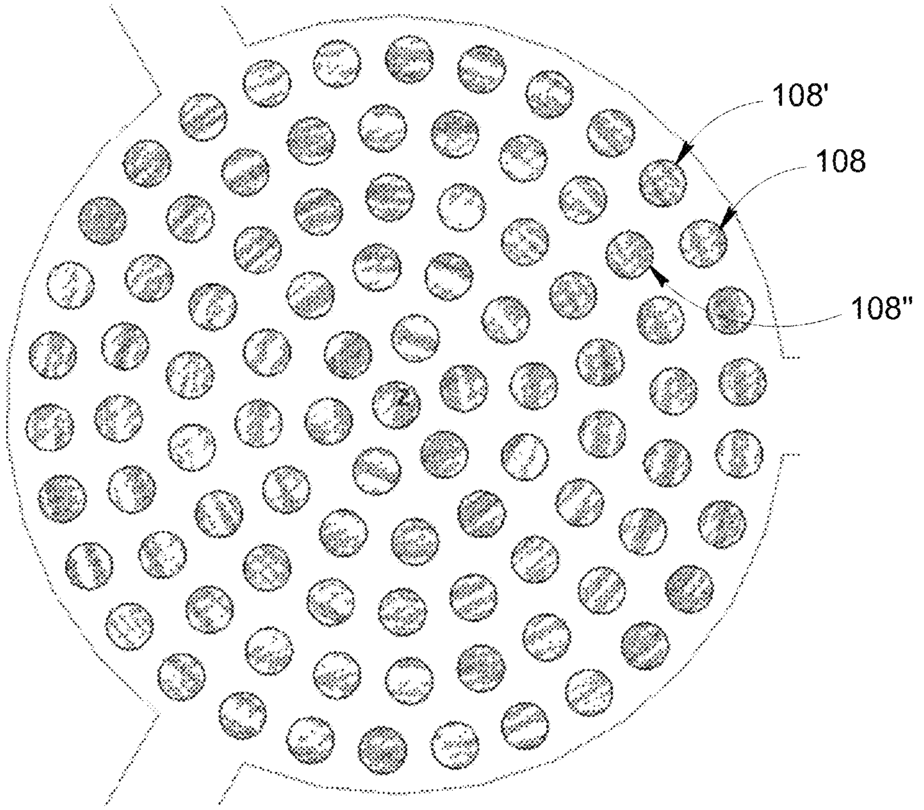
FIG. 1C shows a view of the upper surface of the single layer substrate of FIG. 1A

FIG. 1C shows a view of the upper surface 109 of the single layer substrate 101 of FIG. 1A to further clarify the arrangement and spacing of respective vias 108. Various common aspects and details of the circulator described above in connection with FIGS. 1A-1B may not be repeated in order to avoid obscuring the presently described representative embodiment.

As shown, the plurality of vias 108 is disposed in concentric circles extending from a central via 122 to the edge of the area 112. Notably, however, between each concentric circle of vias 108, an offset is provided to reduce or minimize the risk of cleaving along. To this end, vias 108 and 108' are in an outermost circle of vias and are offset from vias in the next (second outermost) circle of vias. As shown in FIG. 1C each successive circle of vias 108 is arranged to provide this offset between vias 108 of the neighboring immediately adjacent circle of vias 108.

Furthermore, each of the vias 108 is spaced from it immediately adjacent via 108 by a sufficient distance that the structural integrity of the single layer substrate 101 is not substantially adversely compromised. So for example, with reference to FIG. 1C, via 108 is spaced from via 108' and from 108" by a sufficient distance structural integrity is not substantially adversely compromised. Notably, the quantitative magnitude of the spacing between adjacent vias depends on a number of parameters including, but not limited to, the material selected for the single layer substrate 101, the thickness of the single layer substrate 101, and the size (area) of each via 108.

The size (area) of the vias 108, location and the number of vias 108 needed to generate the magnetic field that guides electromagnetic waves in one direction also depends on a variety of factors including, but not limited to, the material selected for the single layer substrate 101, the thickness of the single layer substrate 101. Just by way of illustration, providing a dozen vias of the size shown in FIG. 1C across the area 112 would not likely generate a guiding magnetic field with sufficient strength to guides electromagnetic waves in one direction (e.g., clockwise), and prevent their propagation in a second direction (counterclockwise) opposite the first direction. Similarly, providing larger and less distantly spaced vias than shown in FIG. 1C may generate a guiding magnetic field with sufficient strength to guides electromagnetic waves in one direction, but ultimately may compromise the structural integrity of the single layer substrate 101, and add complexity and cost to the fabrication of the circulator 100.

Figure 1D:
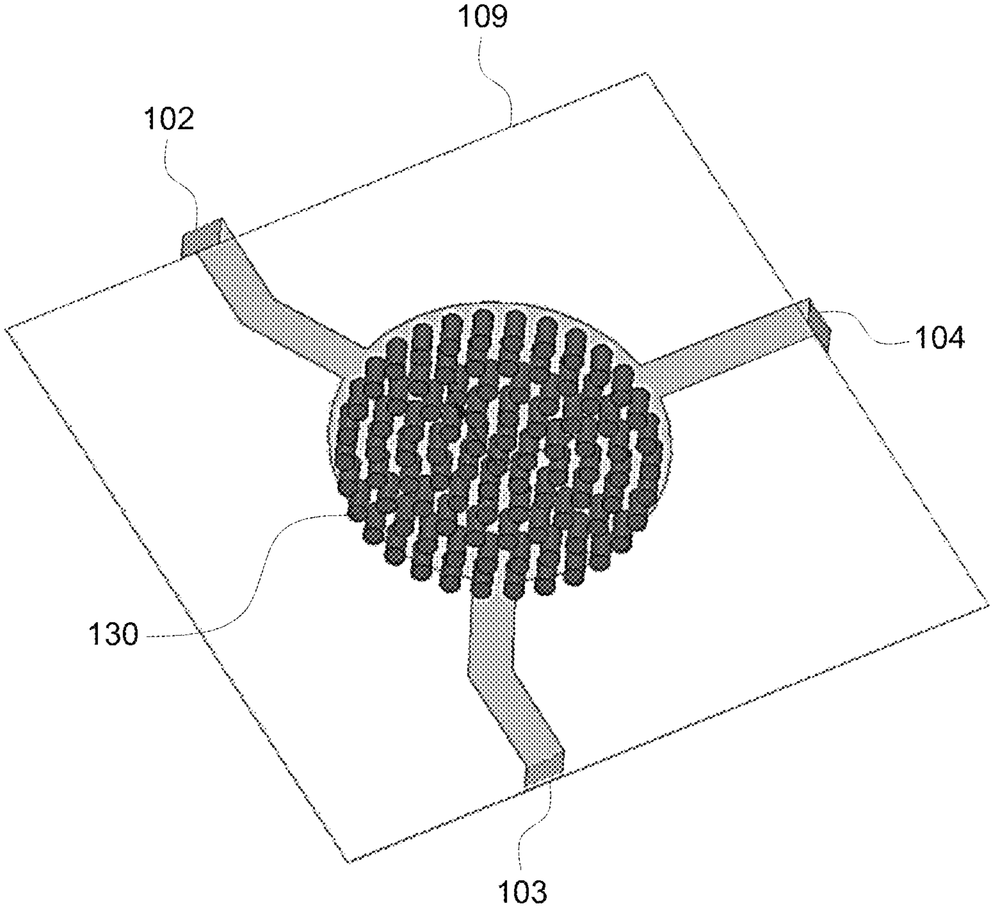
FIG. 1D is a cutaway view of the circulator of FIG. 1A from beneath the circulator, according to a representative embodiment.

FIG. 1D is a cutaway view of the circulator 100 of FIG. 1A from beneath the circulator 100, according to a representative embodiment. Various common aspects and details of the circulator described above in connection with FIGS.

1A-1C may not be repeated in order to avoid obscuring the presently described representative embodiment.

As shown, ferrimagnetic elements 130 are formed by providing the ferrimagnetic material in the vias 108. The vias 108 extend through the thickness of the single layer substrate 101 and are typically capped and in contact with both the signal plane above and ground plane below. They would need to be applied in this manner as doing a partial drill with a thin substrate is difficult, if not impossible. The minimum depth would be equal to the substrate thickness.

Notably, while the upper surface 109 of the single layer substrate 101 can be seen, the thickness of the single layer substrate 101 is not shown for a better view of the ferrimagnetic elements 130 disposed in the vias 108. As will be appreciated from a review of FIG. 1D, the ferrimagnetic elements 130 generally completely fill and take on the shape of the vias 108 into which they are disposed. In the illustrative embodiment in which the vias have a cylindrical shape/volume, the ferrimagnetic elements 130 are cylinders as well. Notably, this is merely illustrative and the vias 108 may have another three-dimensional shape that once filled provides the shape of the ferrimagnetic elements 130. Just by way of example, the vias 108 may have a square cross-section and the ferrimagnetic elements 130 have a cubic shape or a three-dimensional rectangular shape, depending on the depth of the via 108.

Figure 2A:
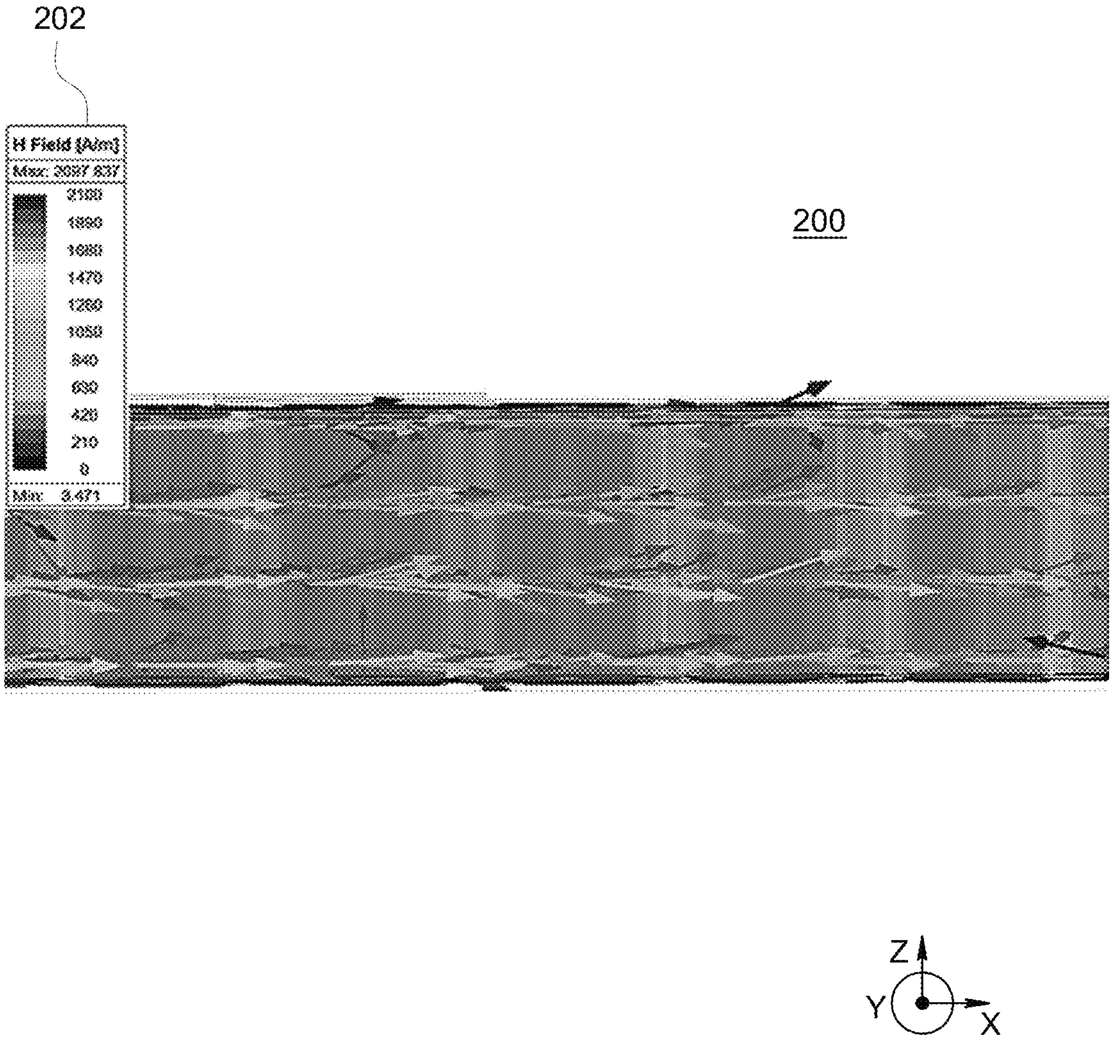
FIG. 2A is a conceptual view showing magnetic field (H-field) vector orientation in a circulator according to a representative embodiment.

FIG. 2A is a conceptual view showing magnetic field (H-field) vector orientation 200 in a circulator according to a representative embodiment. Various common aspects and details of the circulator described above in connection with FIGS. 1A-1D may not be repeated in order to avoid obscuring the presently described representative embodiment.

Magnetic field vectors are shown as arrows in the x-y plane (e.g., the x-y plane of the vias 108 and the DC magnet of FIG. 1A, for example). The different shades of gray refer to an H field magnitude scale 202. As can be appreciated, the overwhelming direction of the magnetic field vectors is in the same direction (the +x-direction in the coordinate system of FIG. 2A with the bias magnetic field from the DC magnet 106 is in the +z direction). This direction is a snap-shot of a portion of the rotational direction of the H-field vectors. As such, because the ferrimagnetic elements 130 are operating in tandem with each other to generate an aggregate action as described above, and along the x and y axes of the coordinate system shown, the overall magnetization vector (i.e., the magnetization vector is a sum of the biasing field and the incident AC signal field as noted above) is substantially continuous with spacing great enough effectively to be invisible to the input electromagnetic signal. Accordingly, FIG. 2A shows the H field in a circular motion extending to the edge of the array with substantially no independent deviation of the direction of the vector of each ferrimagnetic element.

Figure 2B:
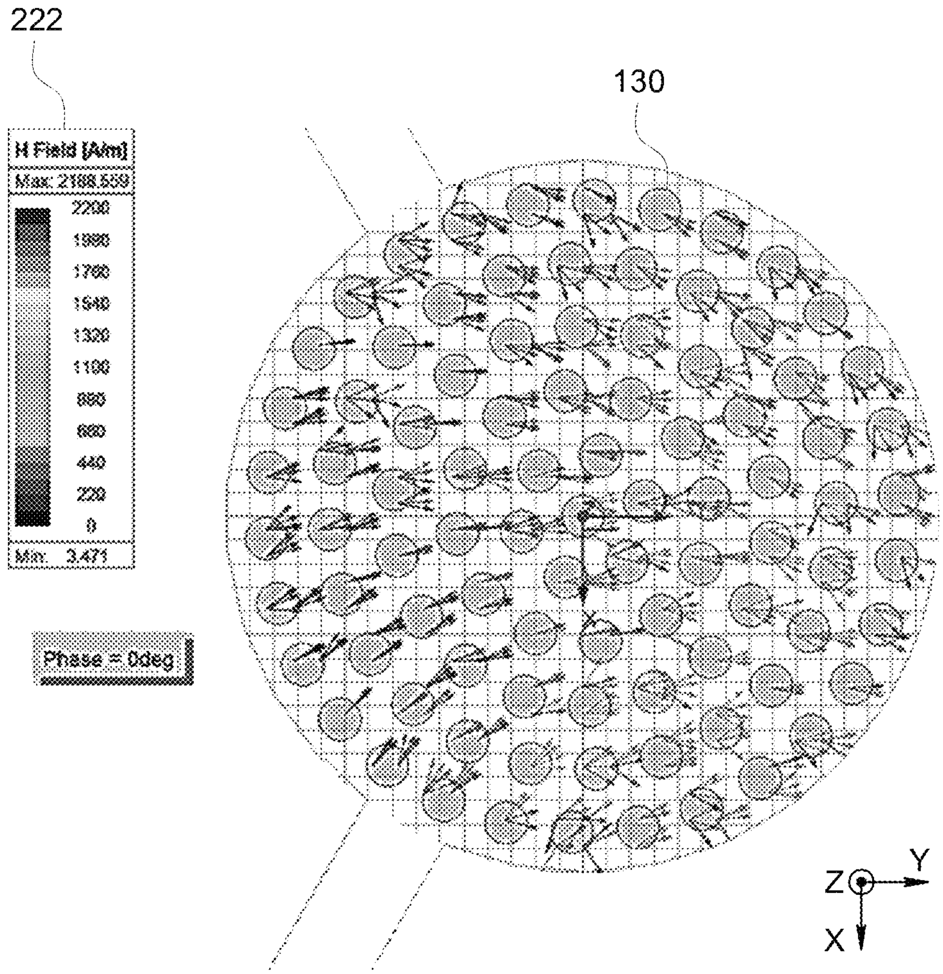
FIGS. 2B-2D show H-field vectors generated in vias having ferrimagnetic material disposed therein at different phases of rotation according to a representative embodiment.
Figure 2C:
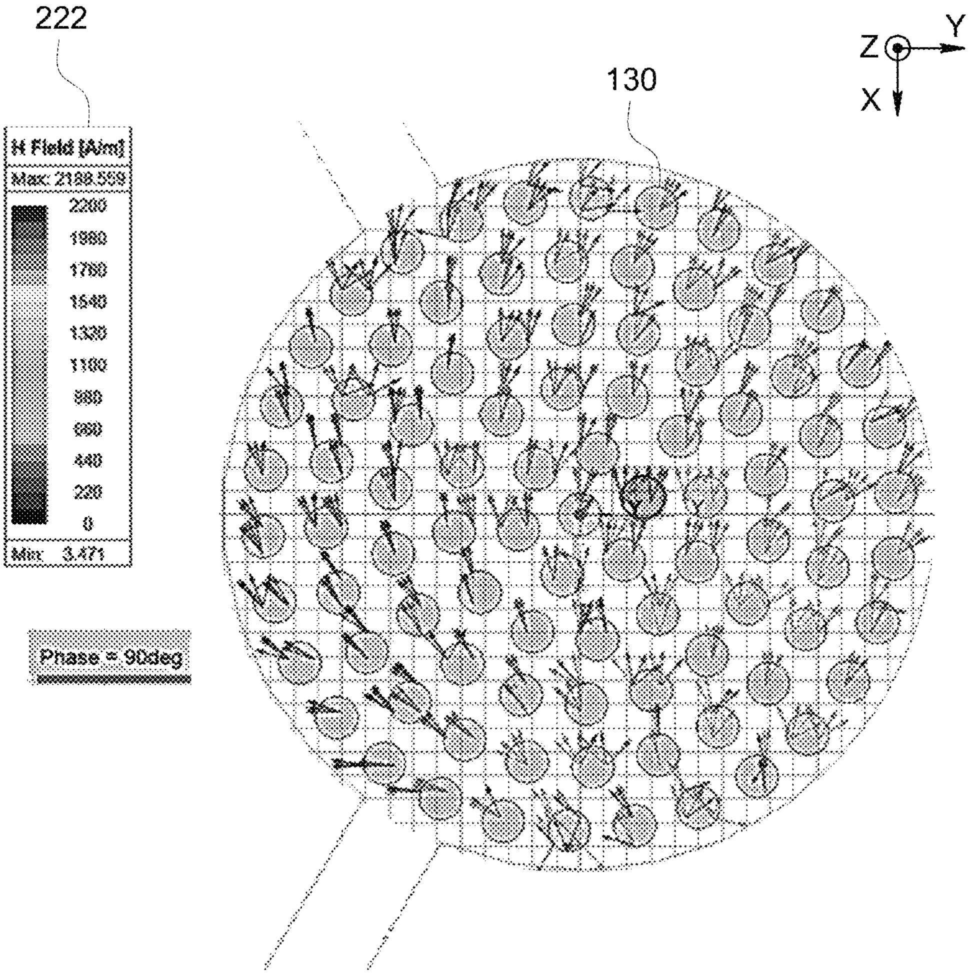
Figure 2D:
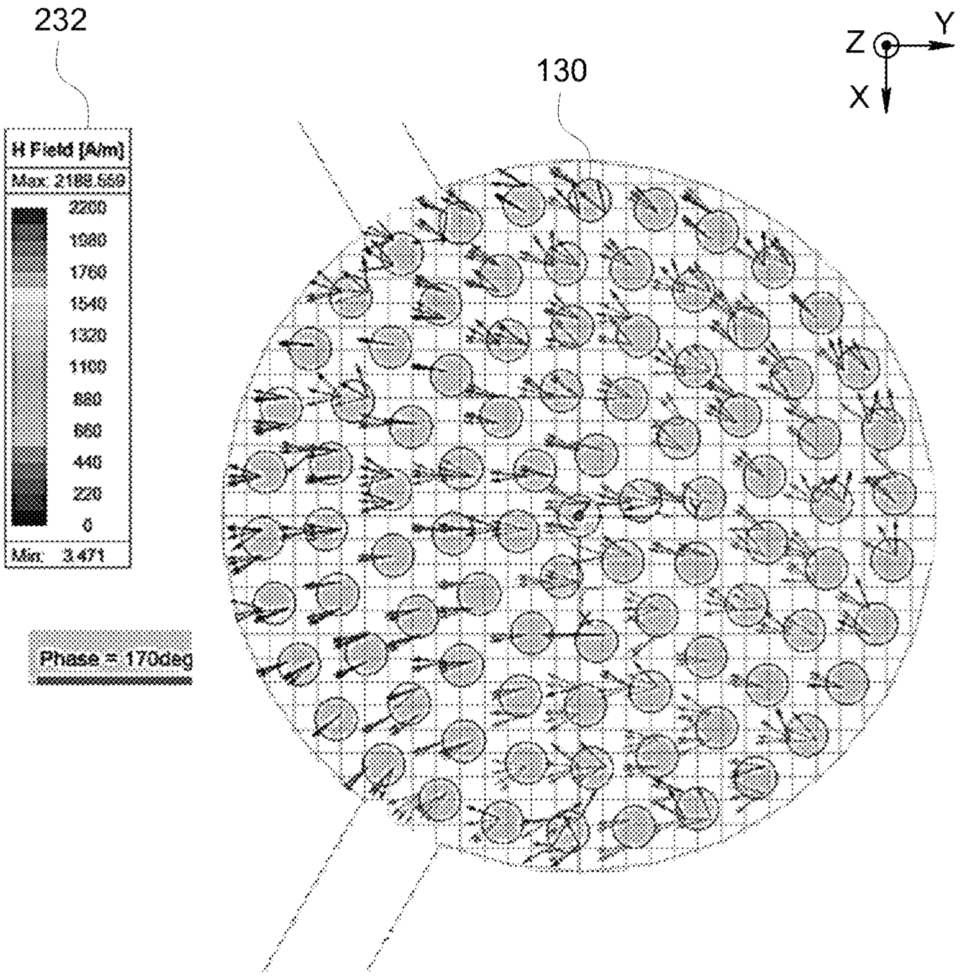

FIGS. 2B-2D show H-field vectors generated in vias having ferrimagnetic material disposed therein at different phases of rotation according to a representative embodiment. Various common aspects and details of the circulator described above in connection with FIGS. 1A-1D may not be repeated in order to avoid obscuring the presently described representative embodiment.

FIG. 2B shows the H-field vectors (arrows) of the ferrimagnetic elements 130 at a moment in time when the phases of the magnetic field are at zero phase. Notably, the bias magnetic field is in along the −z axis and into the plane of the page.

The different shades of gray of the arrows refer to an H field magnitude scale 222 at this particular moment in time. As will become clearer with the description of FIGS. 2C-2D, the preferred magnetic dipole alignment generated within the ferrimagnetic elements 130 results in a magnetic field oriented in a counterclockwise direction (i.e., the vector sum of the magnetic field vectors described above).

FIG. 2C shows the H-field vectors (arrows) of the ferrimagnetic elements 130 at a moment in time when the phases of the magnetic field are at a phase of 90°. Notably, the bias magnetic field is in along the −z axis and into the plane of the page.

The different shades of gray of the arrows refer to an H field magnitude scale 222 at this particular moment in time. As shown, the H field vectors shown in FIG. 2C have rotated 90° from their orientation in FIG. 2B. As such, the preferred magnetic dipole precession direction generated within the ferrimagnetic elements 130 results in a magnetic field with a direction motion counterclockwise about the z-axis as described above FIG. 2D shows the H-field vectors (arrows) of the ferrimagnetic elements 130 at a moment in time when the phases of the magnetic field are at a phase of 170°. Notably, the bias magnetic field is in along the −z axis and into the plane of the page.

The different shades of gray of the arrows refer to an H field magnitude scale 222 at this particular moment in time. As shown, the H field vectors shown in FIG. 2C have rotated 80° from their orientation in FIG. 2A and 170° from their orientation in FIG. 2B. As such, the preferred magnetic dipole alignment generated within the ferrimagnetic elements 130 results in a magnetic field oriented in a counterclockwise direction (i.e., the vector sum of the magnetic field vectors described above).

Figure 3A:
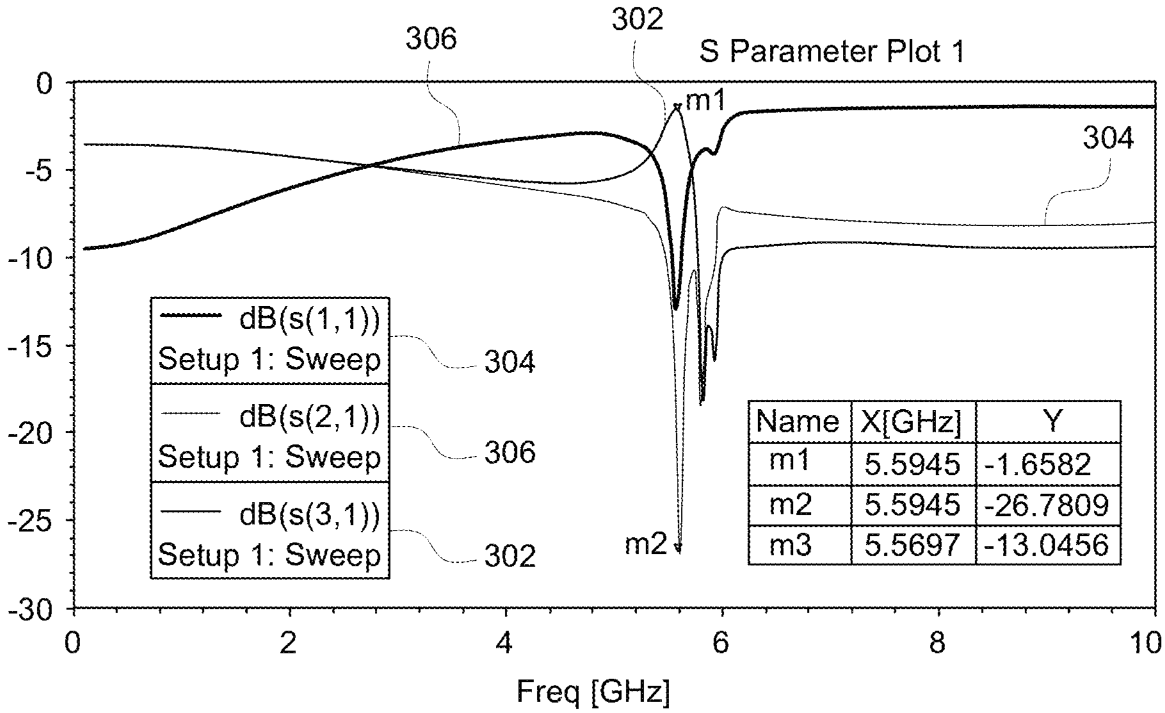
FIG. 3A is a graph of S-parameters S11, S21, and S31 of a circulator according to a representative embodiment.

FIG. 3A is a graph of S-parameters S11 (304), S21 (306), and S31 (302) of a circulator operating at approximately 5.6 GHz according to a representative embodiment. Various common aspects and details of the circulator described above in connection with FIGS. 1A-2D may not be repeated in order to avoid obscuring the presently described representative embodiment.

Notably, compared to the circulator of FIG. 1A, for example, the first and second ports of the circulator that provides the S parameters of FIG. 3A are switched. As such, and as shown for example in the circulator of FIG. 5A, port 1 is on the upper left side of the circulator, port 2 is on the upper right side of the circulator, and port 3 is at the bottom of the circulator. Notably, the orientation of the bias magnetic field causes a counterclockwise motion of the H field in the circulator.

As will be appreciated S31 302, which relates to the energy passing from port one to port 3, is comparatively high. By contrast, the S21 304, which represents the energy from port one to port two (in the clockwise direction) is comparatively low. Moreover, S11 306 which represents the reflection at port 1 is also comparatively low. So, energy of an input signal to port 1 is highly transferred to port 3, but is not substantially reflected at port 1. Similarly, the amount of energy at the input signal at port 1 that is transmitted to port 2, is comparatively small. Although not shown, S parameters for transmission of electromagnetic signals input to port one and guided in the counterclockwise direction can be determined. These S parameters would show a comparatively high degree of energy transmission from one port to the next (e.g., S2,3) in the counterclockwise direction to be comparatively high, and energy transmission from one port to the next (e.g., S3,2) in the clockwise direction to be comparatively low. As such, the device that provides the data of FIG. 3A functions well as a circulator.

Figure 3B:
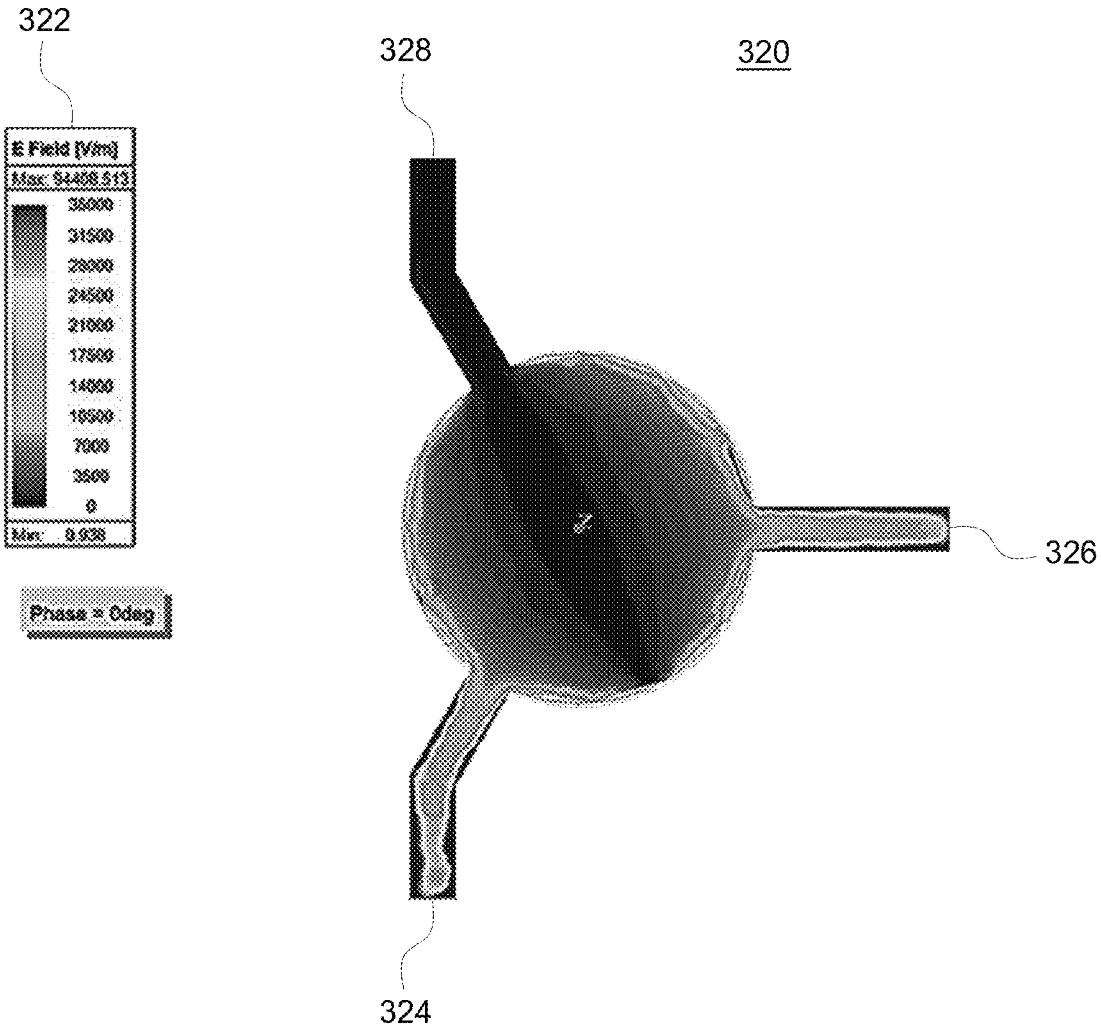
FIG. 3B shows electric field (E-field) strength of a circulator according to a representative embodiment.

FIG. 3B shows electric field (D-field) strength of a circulator according to a representative embodiment. Various common aspects and details of the circulator described above in connection with FIGS. 1A-3A may not be repeated in order to avoid obscuring the presently described representative embodiment.

In the circulator 320 shown in FIG. 3B, the orientation of the bias magnetic field causes electromagnetic signals input to an input port 324 (port 1) to be guided in the counter-clockwise direction, and rejected in the clockwise direction. The input port 324 receives an incoming electromagnetic signal from a source (not shown). Based on the scale 322 of the electric field strength of the signal incident on the input port 324, it can be seen that the electromagnetic signal transmitted from the input port 324 to a second port 326. By contrast, based on the scale 322 of the electric field strength of the signal incident on the input port 324, it can be seen that the electromagnetic signal transmitted (in the clockwise direction) from the input port 324 to a third port 328 is comparatively low. As such, the rejection of an input electromagnetic signal at the input port 324 at port 3 is comparatively very high. By similar analysis, other degrees of energy transfer (high or low) can be determined for each adjacent port of the circulator 320.

Figure 4:
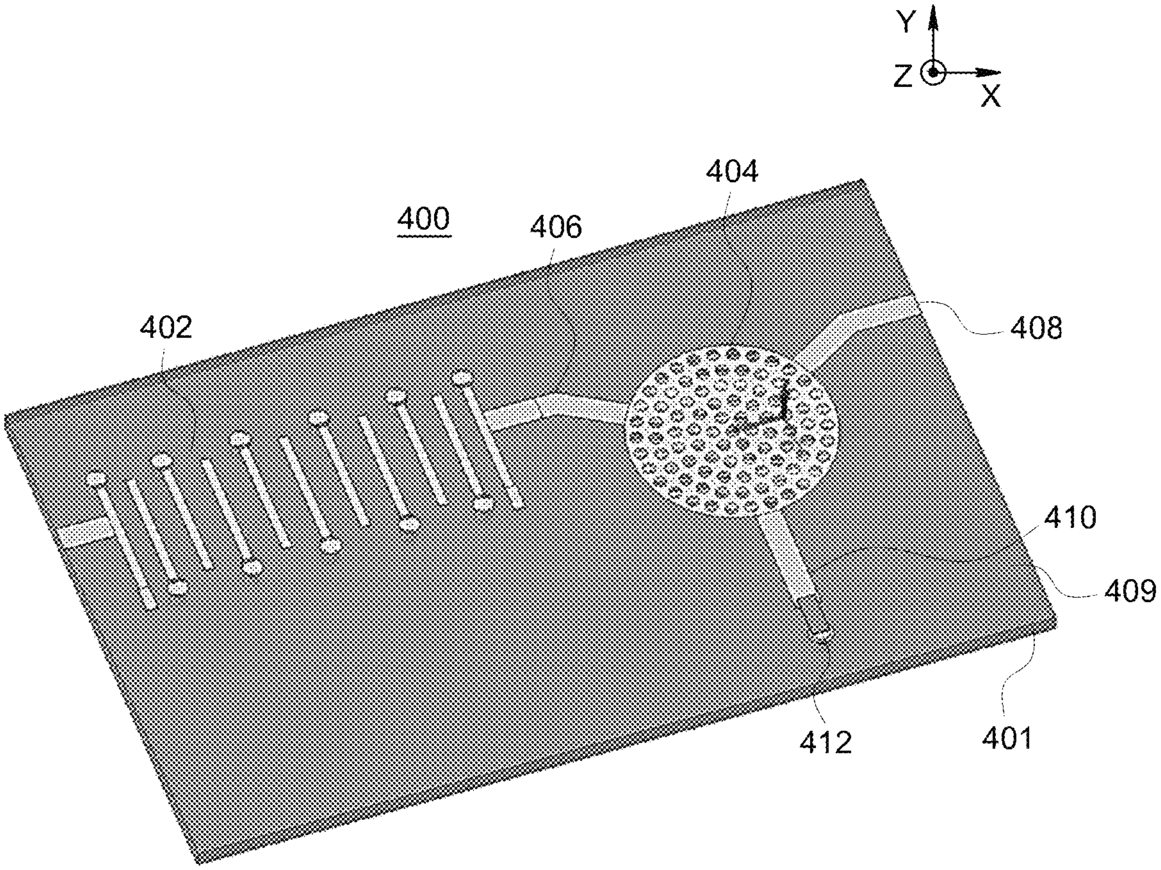
FIG. 4 is a top view of a device comprising a circulator, and a filter to provide isolation according to a representative embodiment.

FIG. 4 is a top view of a device 400 comprising a circulator, and a filter to provide isolation according to a representative embodiment. Various common aspects and details of the circulators described above in connection with FIGS. 1A-3D may not be repeated in the description of device 400 in order to avoid obscuring the presently described representative embodiment.

The device 400 comprises a filter 402 disposed over an upper surface 409 (in the plane of the page (x-y plane of the coordinate system of FIG. 4) of a single layer substrate 401. The bias magnetic field is oriented in the −z direction (into the plane of the page), and thus causes electromagnetic signals input to an input port 406 (port 1) to be guided in the clockwise direction, and rejected in the counterclockwise direction.

The output from the filter 402 is provided to the input port 406. With the circulator operating in the clockwise direction, the signal from the filter is provided to a second port 408. A third port 410 is terminated into a 50Ω thin film resistor 412 disposed on the upper surface 409 of the single layer substrate 401 to ground through a conductive via (not shown) that extends to a lower surface of the single layer substrate over which the ground plane (not shown) is disposed (i.e., the lower surface opposing the upper surface 409). This conductive connection to ground ensures that any power reflected from the second port 408 is diminished by the thin film transistor 412 and dissipated as heat. Notably, the impedance of the filter 402 and the circulator 404 would be matched to minimize reflection of the incident electromagnetic signal at the input port 406.

Figure 5A:
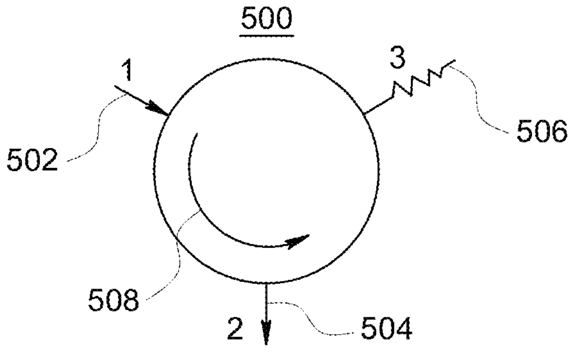
FIG. 5A is a circuit diagram a circulator according to a representative embodiment.

FIG. 5A is a circuit diagram a circulator 500 according to a representative embodiment. Various aspects and details of the circulator 500 are common to those described above in connection with various representative embodiments of FIGS. 1A-4. Such aspects and details are not necessarily repeated in order to avoid obscuring the presently described representative embodiment.

Circulator 500 functions as an isolator. Notably, an input signal is input at port 1 502 is directed along a counter-clockwise direction 508 toward port 2 504, while a signal entering port 2 504 is directed to port 3 where it is dissipated through a 50-ohm load resistor.

Figure 5B:
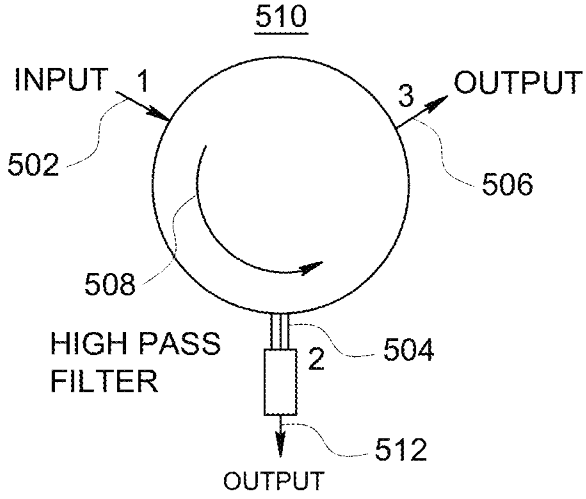
FIG. 5B is a circuit diagram of a diplexer according to a representative embodiment.

FIG. 5B is a circuit diagram a circulator 510 according to a representative embodiment. Various aspects and details of the circulator 510 are common to those described above in connection with various representative embodiments of FIGS. 1A-5A. Such aspects and details are not necessarily repeated in order to avoid obscuring the presently described representative embodiment.

Circulator 510 functions as a diplexer. Notably, an input signal is input at port 1 502 is diverted to a high pass filter at port 2 504 traversing along a counterclockwise direction 508 toward port 2 504 as shown. This results in the high-frequency signal's being split from lower frequency components. The remainder of the band continues in the counterclockwise direction 508 to port 3 506. The circulator 510 thus splits the incident signal into low and high frequency portions.

Figure 5C:
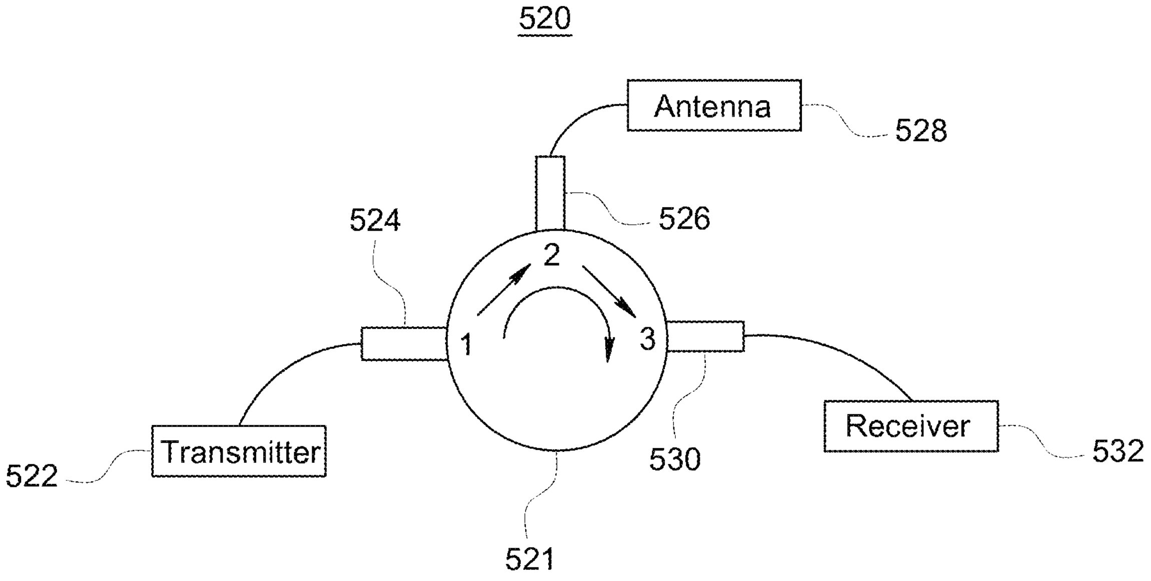
FIG. 5C is a circuit diagram of an RF circulator deployed in a transmission/reception device according to a representative embodiment.

FIG. 5C is a circuit diagram a circulator 520 according to a representative embodiment. Various aspects and details of the circulator 520 are common to those described above in connection with various representative embodiments of FIGS. 1A-5B. Such aspects and details are not necessarily repeated in order to avoid obscuring the presently described representative embodiment.

Circulator 520 functions as a duplexer. The incident/input signal from a transmitter is provided at port 1 524, and is transmitted in a clockwise direction to port 2 526, while the receive signal from the antenna connected to port 2 526 is directed to port 3 528 and is provided to the receiver. As such, the circulator 502 functions to substantially isolate the transmitter and the receiver from each other.

The illustrations of the embodiments described herein are intended to provide a general understanding of the structure of the various embodiments. The illustrations are not intended to serve as a complete description of all of the elements and features of the disclosure described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The preceding description of the disclosed embodiments is provided to enable a person ordinarily skilled in the art to practice the concepts described in the present disclosure. As such, the above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents and shall not be restricted or limited by the foregoing detailed description.

The invention claimed is:

1. A circulator, comprising:
- a single layer substrate, wherein a plurality of vias exist in the single layer substrate, and some or all of the plurality of vias comprises a ferrimagnetic material disposed therein;
- a first port, a second port and a third port disposed over the single layer substrate; and a magnet disposed over the vias, wherein a preferred magnetic dipole alignment is generated within the ferrimagnetic material having a first direction that substantially prevents an electromagnetic signal from propagating in a second direction opposite the first direction.

2. The circulator of claim 1, wherein the single layer substrate comprises an upper planar surface and the magnet generates a magnetic field substantially perpendicular to the upper planar surface.

3. The circulator of claim 2, wherein the ferrimagnetic material has a magnetic dipole, and the magnetic field causes the magnetic dipoles to align around an axis of the magnetic field.

4. The circulator of claim 3, wherein upon application of an electromagnetic signal, the magnetic dipoles precess around the axis of the magnetic field.

5. The circulator of claim 4, wherein the precession of magnetic dipoles is in the first direction.

6. The circulator of claim 4, wherein the electromagnetic signal is a radio frequency (RF) electromagnetic signal.

7. The circulator of claim 1, wherein the single layer substrate comprises a ceramic material adapted for operation across a microwave frequency range.

8. The circulator of claim 7, wherein the ceramic material comprises alumina ($Al_2O_3$) aluminum nitride, sapphire, quartz, or zirconium.

9. The circulator of claim 7, wherein the substrate is a single layer thick film substrate.

10. The circulator of claim 1, wherein an overlap of the magnet and the plurality of vias comprises an area, and the plurality of vias are disposed from a middle of the area to an edge of the area.

11. The circulator of claim 10, wherein the area comprises a circle and the plurality of vias are disposed in concentric circles from a center of the circle to an outer diameter of the circle.

12. The circulator of claim 11, wherein one or more of the concentric circles is randomly offset from its adjacent concentric circles.

13. The circulator of claim 12, wherein a return loss is better than approximately −15 dB and an insertion loss is better than approximately 3 dB over a frequency range from comparatively low microwave frequencies to millimeter wave frequencies.

14. The circulator of claim 11, wherein one of the plurality of vias comprising the ferrimagnetic material is located at the center of the circle.

15. The circulator of claim 10, wherein the area comprises a triangle and the plurality of vias are disposed in a center of the triangle to outer sides of the triangle.

16. The circulator of claim 15, wherein the first port, the second port and the third port are separated by approximately 120°.

17. The circulator of claim 1, wherein the first port, the second port and the third port are separated from each other by approximately 120°.

18. The circulator of claim 1, wherein an electromagnetic wave propagates in the first direction, and an isolation of the first port to the third port is substantially greater than an insertion loss from the first port to the second port.

* * * * *